(12) United States Patent
Oshins et al.

(10) Patent No.: US 7,328,279 B2
(45) Date of Patent: Feb. 5, 2008

(54) SYSTEM AND METHOD FOR ADDING HARDWARE REGISTERS TO A POWER MANAGEMENT AND CONFIGURATION SYSTEM

(75) Inventors: Jacob Oshins, Seattle, WA (US); Stephane G. Plante, Kirkland, WA (US); Tony D Pierce, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/099,189

(22) Filed: Apr. 4, 2005

(65) Prior Publication Data

US 2005/0187719 A1    Aug. 25, 2005

Related U.S. Application Data

(63) Continuation of application No. 09/809,641, filed on Mar. 15, 2001, now Pat. No. 6,907,474.

(60) Provisional application No. 60/233,296, filed on Sep. 15, 2000.

(51) Int. Cl.
    *G06F 15/173* (2006.01)
(52) U.S. Cl. .................... 709/238; 717/166; 707/103
(58) Field of Classification Search ................ 709/203, 709/238; 717/164, 166; 713/1, 2, 310
    See application file for complete search history.

(56) References Cited

U.S. PATENT DOCUMENTS

| 5,303,379 | A | * | 4/1994 | Khoyi et al. ................ 717/166 |
| 5,483,652 | A | * | 1/1996 | Sudama et al. ............... 707/10 |
| 5,903,894 | A | * | 5/1999 | Reneris ....................... 707/100 |
| 6,061,695 | A | * | 5/2000 | Slivka et al. ................ 715/513 |
| 6,167,511 | A | * | 12/2000 | Lewis ........................... 713/2 |
| 6,173,313 | B1 | * | 1/2001 | Klots et al. .................. 709/203 |
| 6,199,081 | B1 | * | 3/2001 | Meyerzon et al. .......... 715/513 |
| 6,393,386 | B1 | * | 5/2002 | Zager et al. .................. 703/25 |
| 6,418,448 | B1 | * | 7/2002 | Sarkar ....................... 707/104.1 |
| 6,466,654 | B1 | * | 10/2002 | Cooper et al. ........... 379/88.01 |
| 6,499,102 | B1 | * | 12/2002 | Ewertz .......................... 713/1 |
| 6,760,746 | B1 | * | 7/2004 | Schneider ................... 709/203 |
| 6,823,516 | B1 | * | 11/2004 | Cooper ....................... 718/108 |
| 6,895,586 | B1 | * | 5/2005 | Brasher et al. ............. 719/313 |
| 6,901,588 | B1 | * | 5/2005 | Krapf et al. ................ 717/164 |
| 6,931,544 | B1 | * | 8/2005 | Kienhofer et al. .......... 717/118 |
| 6,931,553 | B1 | * | 8/2005 | Plante et al. ................ 713/310 |
| 6,980,944 | B1 | * | 12/2005 | Oshins et al. ................ 703/17 |
| 7,069,554 | B1 | * | 6/2006 | Stammers et al. .......... 717/178 |
| 2003/0097355 | A1 | * | 5/2003 | Kapitskaia et al. ............ 707/3 |

* cited by examiner

*Primary Examiner*—Thong Vu
(74) *Attorney, Agent, or Firm*—Merchant & Gould; Ryan T. Grace

(57) ABSTRACT

A system for adding multiple GPE blocks (in addition to the system/root GPE block device) to a computing system by creating a device entry in the ACPI namespace, and using a _CRS object to describe the system resources consumed by the device is described. The GPE block device may then access associated hardware devices through a well known mechanism (either I/O or Memory Mapped accesses). By creating additional GPE block devices within the ACPI namespace, general purpose events may be delivered using more traditional hardware interrupt mechanisms than with existing systems (e.g., wiring GPE blocks together). Moreover, by putting GPE block devices in the ACPI namespace, hardware components having hardware registers may be "hot plugged" to the computing system.

20 Claims, 5 Drawing Sheets

SYSTEM AND METHOD FOR ADDING HARDWARE REGISTERS TO A POWER MANAGEMENT AND CONFIGURATION SYSTEM

CROSS-REFERENCE TO PRIOR APPLICATIONS

This application claims the benefit of application Ser. No. 09/809,641, filed Mar. 15, 2001 now U.S. Pat. No. 6,907,474, which claims the benefit of United States Provisional Patent Application No. 60/233,296 filed Sep. 15, 2000.

TECHNICAL FIELD

The present invention relates generally to computing devices, and more particularly to power management and configuration in computing devices.

BACKGROUND OF THE INVENTION

ACPI (Advanced Configuration and Power Interface) is an open industry specification that defines a flexible and extensible interface for computer power management and related control operations. In general, the interface enables and supports power management through improved hardware and operating system coordination. ACPI allows the operating system to control the power states of many ACPI-supported hardware components, and/or to pass information to and from some hardware components.

The ACPI Specification describes how a system vendor can use General Purpose Events (GPEs) to inform the operating system that some event occurred, such as a laptop lid being closed or a thermal alert. Typically, a hardware device issues a notification to a hardware register, which in turn surfaces the GPE event. The hardware register is represented to the operating system by a software object commonly called a "GPE block." A GPE block is a logical construct that represents a set of GPE pins on the hardware register. The hardware signals that are connected to those pins are arbitrary in nature (within some guidelines outlined by the ACPI specification). The operating system sees the GPE block as containing two register sets: one to control whether or not a particular pin is enabled, and another to determine if a particular pin is asserted. If the operating system detects that a pin is both enabled and asserted, then it runs an ACPI control method associated with the pin to handle the event. Until now, an ACPI-compliant system supported only a single GPE block. Moreover, the one supported GPE block had a fixed location in I/O space, which is a limited resource in most modern computing systems.

More specifically, the ACPI 1.0 specification provides that 0, 1, or 2 GPE hardware registers can be present in the system, with each GPE hardware register having a different I/O base address. Most operating system developers treat those GPE hardware registers as one "logical" device (the GPE block). The hardware registers that form a GPE block (in ACPI Version 1.0 parlance) share the same address space. That is, if Pin XX is defined for use by GPE0 (the 1st GPE hardware register in the ACPI 1.0 specification), then that same Pin XX cannot be used by GPE1 (the 2nd GPE hardware register in the ACPI 1.0 specification). For these reasons, operating system and computing system developers have been limited to a single logical GPE block, or two GPE hardware registers.

As modern computing systems become more complex, the limitation of one GPE block has proved to be a nuisance to the design and creation of larger computing systems having physically separated hardware components. In short, if a system vendor builds a large computer by connecting four smaller computers, and where each smaller computer has its own GPE block device, then complicated wiring would be required to represent the large computer within the ACPI namespace having only a single GPE block device. For instance, the system vendor may have run the signals from the GPE block devices in each of the smaller computers together to give the illusion that there was a single GPE block device within the large computer. The problems with that solution include that the address space defined by a GPE Block device is finite. A GPE Block can support from 0 to 256 signals. So, for a truly large computer which might have more than 256 signals, it would probably not be possible to wire up all the signals to appear to come from a single GPE block. Sharing signals is possible in some instances but impossible in others and would introduce yet more expensive circuitry to the system. Thus, until now, there has been no way to include multiple GPE block devices in a single computing system.

SUMMARY OF THE INVENTION

Briefly described, the present invention provides for multiple GPE blocks (in addition to the GPE block device defined in the ACPI Specification Version 1.0) by creating a device entry in the ACPI namespace, and using a _CRS object to describe the system resources consumed by the device. The GPE block device may then access associated hardware devices through a well known mechanism (either I/O or Memory Mapped accesses). By creating additional GPE block devices within the ACPI namespace, general purpose events may be delivered using more traditional hardware interrupt mechanisms than with existing systems (e.g., wiring GPE blocks together). Moreover, by creating GPE block devices as devices in the ACPI namespace, they may be dynamically loaded or unloaded from the namespace. In addition, the GPE block devices may be moved from one location within the namespace to another location within the namespace.

These and various other features and advantages, which characterize the present invention, will be apparent from a reading of the following detailed description in conjunction with the associated drawings.

DETAILED DESCRIPTION OF THE PREFERRED EMBODIMENT

Exemplary Operating Environment

Figure 1:
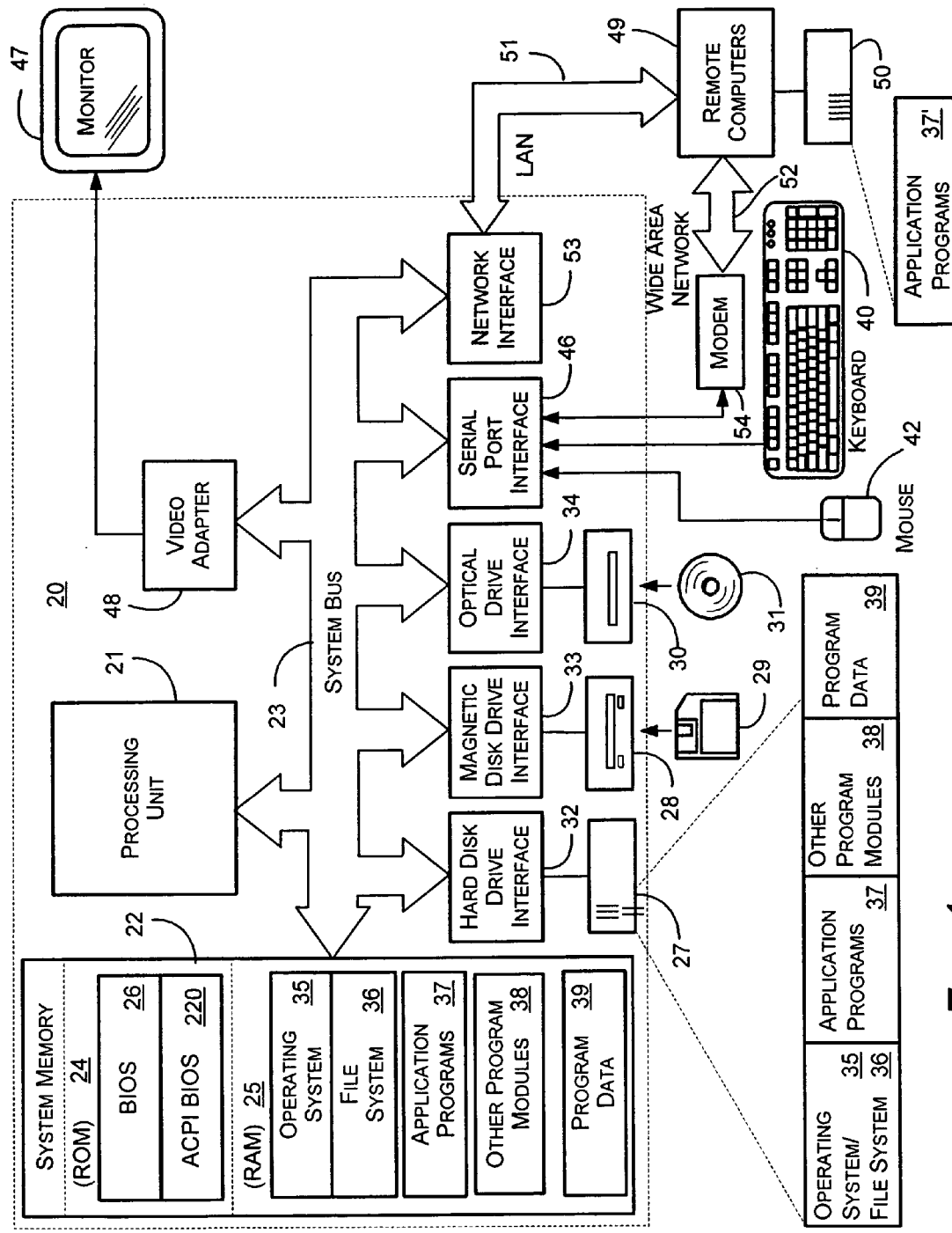
FIG. 1 is a block diagram representing an exemplary computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. On an ACPI system, as described herein, the vendor provided ACPI Machine Language (AML) code, generally referred to as the ACPI BIOS, is also ordinarily stored within the ROM.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000 operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While the present invention is primarily described with respect to the Windows® 2000 operating system, those skilled in the art will appreciate that other operating systems and/or file systems may implement and benefit from the present invention.

Illustrative Configuration Management System

Figure 2:
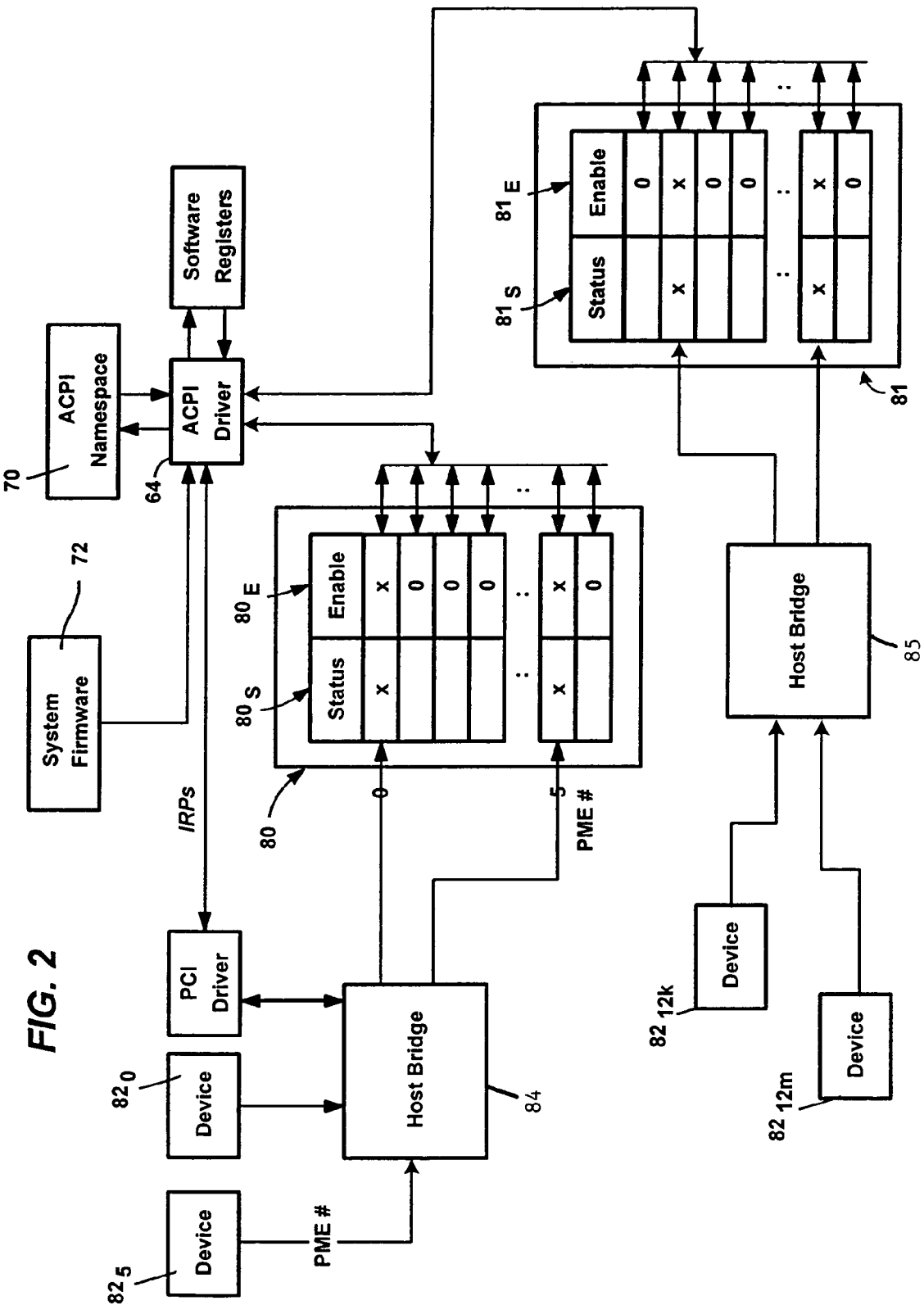
FIG. 2 is a block diagram representing an ACPI system including an ACPI driver capable of implementing the present invention.

Referring to FIG. 2, there is shown a general, exemplary architecture underlying the present invention. In the sample system shown in FIG. 2, a number of hardware devices connect to one of two host bridges 84, 85 (e.g., a PCI bridge), wherein PCI power management supports wake events generated by functions on the PCI bus. The devices that are connected may include a network card $82_5$, a mouse $82_{12m}$, a laptop lid switch $82_O$, keyboard $82_{12k}$, and so forth. Each of the two host bridges 84, 85 is connected to one of two distinct GPE blocks 80, 81 (respectively).

Each GPE block contains a status register $80_S$, $81_S$ and an enable register $80_E$, $81_E$. The hardware devices are connected (via a host bridge 84, 85) to the status registers of the GPE blocks 80, 81. Each hardware device signals general purpose events to the system by sending a power management event signal (PME#) to the status register of its associated GPE block 80, 81. The ACPI driver 64 (described below) owns the general-purpose event registers $80_S$, $80_E$, and other than the hardware device signaling the input pins of the Status register $80_S$, $81_S$, the register bits are only manipulated by the ACPI driver 64. Thus, the ACPI driver 64 manages the bits in the GPE blocks 80, 81 directly, although the source of those events is not directly known and is connected to the system by control methods.

Two GPE blocks 80, 81 are shown in FIG. 2 to illustrate that the invention allows for multiple GPE blocks to be connected to a computing system, and although only two are shown, many more could be easily added to support additional hardware devices. In addition, as described above, one GPE block (e.g., GPE block 81) may actually be composed of two pairs of hardware registers (i.e., two status registers $81_S$ and two enable registers $81_E$). If a machine vendor included two pairs of hardware registers to represent a single GPE block, the registers could be referred to as GPE0_STA, GPE0_EN, GPE1_STA, GPE1_EN. If a GPE block does include two pairs of hardware registers, both pairs are treated logically as a single GPE block in the ACPI namespace 70 (described later), and share the same addressing space within a single GPE block namespace.

Figure 3:
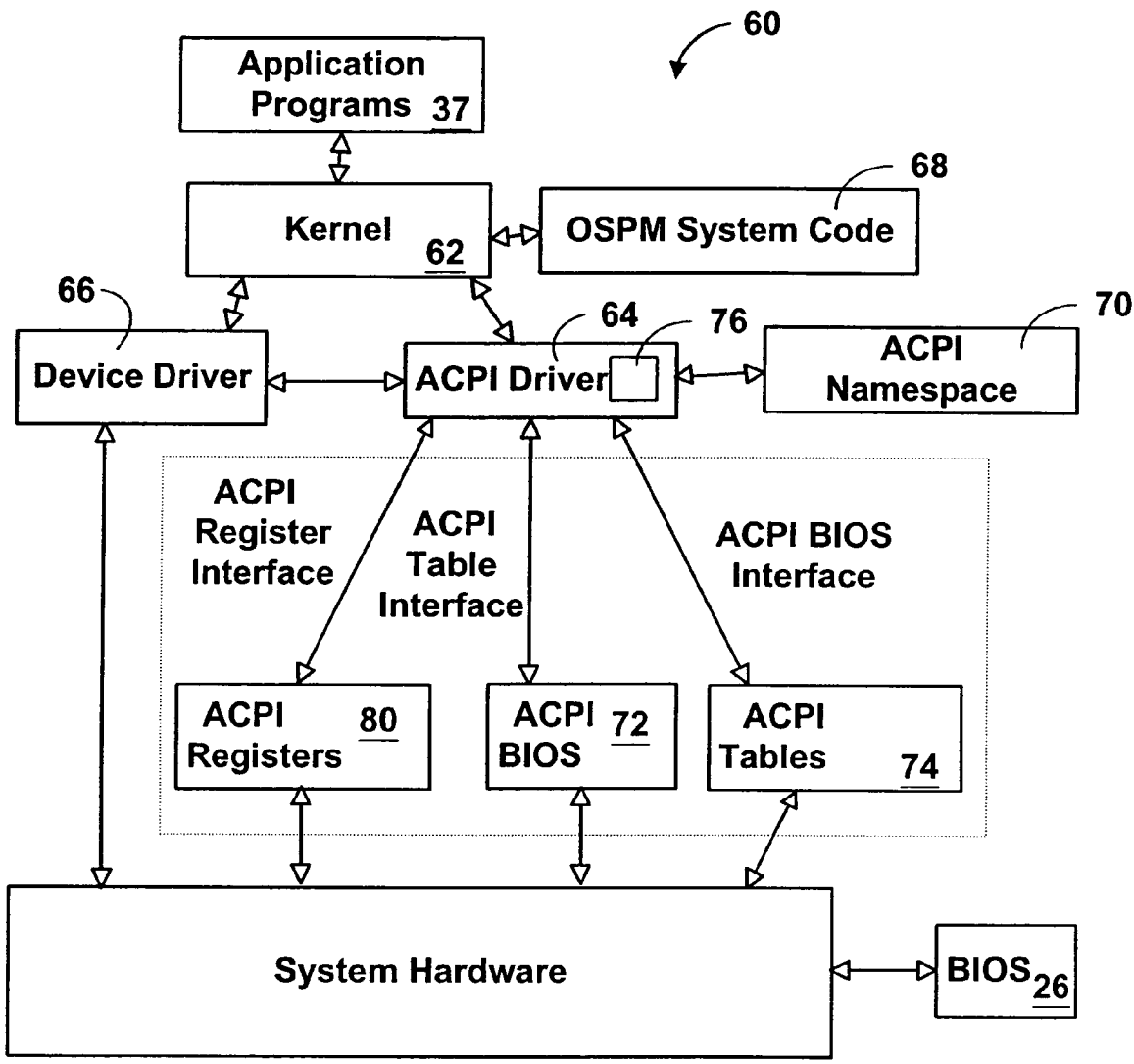
FIG. 3 is a functional block diagram generally representing how devices signal events to the ACPI driver through the use of one or more hardware registers, in accordance with the present invention.

Turning to FIG. 3, a functional block diagram of an ACPI system 60 as implemented in the computer system 20 of FIG. 1 is shown. The ACPI system 60 illustrated is one example of a configuration management system that may benefit from the present invention. The present invention is primarily described herein with reference to the ACPI configuration management system, however, there is no intention to limit the present invention to ACPI. Rather, the present invention is intended to operate with and provide benefits with any operating system, architecture, and/or configuration management system.

As shown, the application programs 37 may interface with a kernel 62, which is a part of the operating system 35, generally via application programming interface (API) calls or the like. The kernel 62 can be generally considered as one or more software modules that are responsible for performing many operating system functions. One such function is passing information between the application programs 37 and the lower level components of the ACPI system 60, such as the ACPI driver 64 (described below) and various device drivers (e.g., device driver 66).

The kernel 37 also interfaces with Operating System Power Management (OSPM) system code 68. The OSPM system code 68 comprises one or more software modules that may be a part of the operating system 35 and that may be used to modify the behavior of certain components of the computer system 20, typically to conserve power in accordance with pre-configured power conservation settings. As is generally known, the various device drivers 66 interface with and generally control the hardware installed in the computer system 20. A driver communicates with other drivers and the operating system components (e.g., an I/O manager), for example in the Windows® 2000 (and Windows NT®) operating systems, by passing I/O request packets, or IRPs.

In general, the ACPI driver 64 is a module that controls the functioning of much of the ACPI system 60. The ACPI driver 64 may be supplied as part of the operating system 35 or as a separate component. In the described system, the ACPI driver 64 is loaded during system start-up at the base of a tree of devices, where it acts as an interface between the operating system 35 and the BIOS 26. The responsibilities of the ACPI driver 64 include support for plug and play (PnP) and, in keeping with the present invention as described below, power management. The ACPI driver 64 is responsible for initiating and maintaining the ACPI system 60, such as by populating an ACPI namespace 70 (represented in FIG. 4 and described below) at system startup, loading and unloading description blocks from the ACPI namespace 70, handling certain generic events triggered by ACPI-compliant hardware, and handing off other events to modules registered to handle those events.

The ACPI driver 64 makes use of several components when performing the functions of the ACPI system 60. One component is the ACPI BIOS 72, which refers to the portion of system firmware that is compatible with the ACPI specification. Generally stated, the ACPI BIOS 72 is part of the code that boots the machine (similar to the BIOS present in most conventional computer systems) and implements interfaces for power and configuration operations, such as sleep, wake, and some restart operations. The ACPI BIOS 72 contains definition blocks used to construct ACPI Tables 74, as is described in greater detail below. Note that although the BIOS 26 and the ACPI BIOS 72 are illustrated as separate components in FIG. 2, they may be (and typically are) implemented as one component in the computer system 20.

The ACPI Tables 74, generally known as Differentiated Definition Blocks (DDBs), are composed of as few as one, but may have more than one, definition block that contains data and/or control methods. The definition blocks are written in an interpreted language called ACPI Machine Language (AML), the interpretation of which is performed by an AML interpreter 76 within the ACPI driver 64. Generally, each set of data and/or control methods defines and provides access to a respective hardware device. The tables include header data structures that contain information about what the block contains, for example, whether it is a Differentiated System Description Table (DSDT) or a Secondary System Descriptor Table (SSDT). Each table (SSDT or DSDT) contains only one Definition Block. One such definition block, known as a Differentiated System Description Table (DSDT) describes the base computer system, that is, the DSDT contains a Differentiated Definition Block (DDB), which describes the root system. Often, the DSDT includes a root (or legacy) GPE block device and may include others. Alternatively, although not preferred, all or some GPE blocks may be included in SSDTs. Other definition blocks may be provided to describe additional ACPI devices, such as additional GPE block devices.

As mentioned, the definition blocks may contain control methods. A "control method" is a software module that defines how the ACPI system 60 performs a hardware-related task. For example, the ACPI system 60 may invoke a control method to read the temperature of a thermal zone, change the device power state of a modem, and so forth. Control methods are written in AML, are stored in the definition blocks within the ACPI BIOS 72, and are loaded into the ACPI namespace 70 (FIG. 4), typically at system boot up. Once in the ACPI namespace 70, the control methods may be invoked by other components in the ACPI system 60, such as device drivers or the like, and are then interpreted and executed by a virtual machine in the ACPI driver 64.

In accordance with this implementation of the invention, the ACPI tables 74 include AML code to construct GPE block devices when inserted into the ACPI namespace 70, a root or legacy GPE block device and one or more additional GPE block devices. State information about the GPE blocks is stored in some data structure or memory location, for example in a device extension associated with the GPE block or even in the context field of a callback function. Where the state information is stored is a design consideration and may be implemented in any functional way.

As any additional GPE block devices that are described in the ACPI tables 74 are loaded in the ACPI namespace 70, they may be added to a global list identifying the GPE block devices. The following is one sample of ASL code that may be included in the ACPI tables and used to create an additional GPE block device:

```
// ASL example of a non-root GPE block
Device (\_SB.PCI0.ISA0.GPE1) {
Name (_HID, "ACPI0006")
Name (_UID, 2)
Name (_CRS, Buffer( ) {
    IO (Decode16, FC00, FC00, 1, 2,) // Status register at FC00-FC01
    IO (Decode16, FC02, FC02, 1, 2,) // Enable register at FC02-FC03
    IRQ ( Level, ActiveHigh, Shared,) { 5 }
    }
}
Method (_L12)   { ... }
Method (_E13)   { ... }
Method (_PRS)   { ... }
Method (_SRS)   { ... }
```

Figure 4:
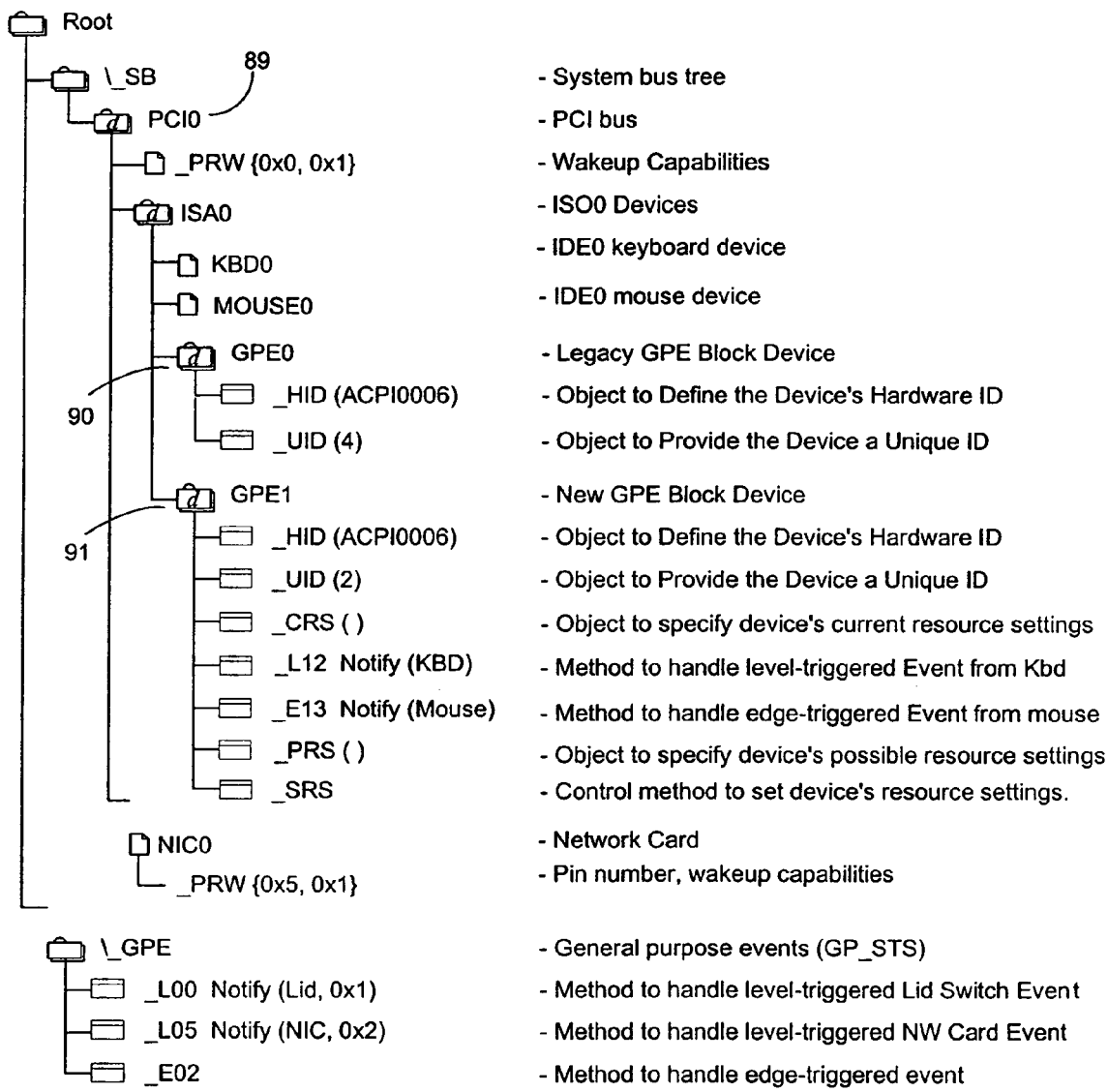
FIG. 4 is a representation of a hierarchical namespace built by the ACPI driver from firmware information to represent a computer system, and accessed thereby to execute methods specified in the firmware, including wake operations, in accordance with the present invention.

Shown in FIG. 4 is one illustrative ACPI namespace 70, containing a namespace root, several illustrative branches under the root, and several other objects of various types. For example, under the root is a system bus tree \_SB. The \_SB namespace includes namespace objects that define ACPI-compliant components attached to the system bus. One example of such a namespace object is the PCI bus namespace object 89. Each namespace object may have other objects as children thereof, such as data objects, control methods, or other namespace objects (e.g., ISA0 device object). The objects having a _PRW child are those with wakeup capabilities, and the pin number in the ACPI register to which they are wired is specified therein, along with wakeup information, e.g., the "deepest" system state from which the device can wake the computer.

Several control methods may be loaded in the ACPI namespace in connection with various objects, including the methods run on detection of wakeup events in the \_GPE namespace. For example, as shown in FIG. 4, a notify control method will execute on a network card (NIC) event wired to pin 5 of the hardware register 80. The \_GPE namespace includes additional control methods to handle other general purpose events (including wakeup events) triggered by ACPI-aware components in the ACPI system 60. Any control methods associated with the pins of the underlying GPE register exist as children of the GPE block device, not within the \_GPE namespace (as had previously been done). For GPE events, the ACPI driver 64 executes the control method of the name \_GPE._Exx and \_GPE._Lxx, where, as used herein, 'E' indicates an edge-triggered event, 'L' indicates a level-triggered event, and xx represents a hex value format of the event that needs to be handled.

In accordance with this particular implementation of the present invention, the hardware register (GPE block) 80 defined in the ACPI Specification Version 1.0 is continued, and, in addition, support for multiple hardware registers is also supported. Thus, a machine vendor can add additional GPE hardware registers (e.g., more than a single GPE block) to a system and then expose those additional GPE registers to the operating system by adding them as GPE block devices to the ACPI namespace 70. When more than one GPE block is included in a computing machine, one may be identified as the traditional or legacy GPE block that is expected in accordance with the ACPI Specification Version 1.0. In this way, the operating system can identify which GPE block, if any, is required to boot the computer. That is, by keeping the ACPI Specification Version 1.0 method of describing a GPE block, the operating system guarantees that one GPE Block will always be active. This could be important in getting a system to boot. For example, the ACPI embedded controller requires a GPE block device to be loaded to execute properly, and in turn, the ACPI driver requires access to the embedded controller to properly determine the configuration of the machine.

The legacy GPE block is illustrated in FIG. 4 as device GPE0 90. Additional GPE blocks may either be included as additional tables within the DSDT or added to the ACPI namespace 70 through tables within an SSDT that describes the additional GPE blocks. By following a description convention, such as the convention described herein, the ACPI tables 74 can be used to define one or more new devices within the ACPI namespace, such as device GPE1 91 (FIG. 4). The following description is but one example of a description convention that may be used to add GPE blocks to the ACPI namespace 70 and others will become apparent to those skilled in the art upon reading the teachings of the invention.

As mentioned above, ACPI tables 74 are added to define new GPE block devices having the following characteristics. First, a table associated with a device having a hardware ID that indicates the device is a GPE block is created. Typically, a table may use the _HID object to define the device's hardware ID. As is known to those skilled in the art, the _HID object is used to supply the operating system with the device's Plug and Play Hardware ID. When describing a platform, use of any _HID objects is optional. However, a _HID object must be used to describe any device that will be enumerated by the ACPI driver 64. The ACPI driver 64 only enumerates a device when no bus enumerator can detect the device ID. For example, devices on an ISA bus are enumerated by the ACPI driver. In one embodiment, the hardware ID "ACPI0006" may be used to indicate a new GPE block.

Next, the GPE block device (as defined in the ACPI tables 74) should include a _CRS object to describe which resources are used to access the GPE block, except that a single GPE block device (e.g., GPE0) omits the _CRS object to identify itself as the legacy GPE block device. To represent the GPE block associated with the FADT, a GPE block device only includes the ACPI0006 device in the tree, without any _CRS, _PRS, _SRS, or other GPE-specific methods. Any GPE block device that does not represent the legacy GPE block device contains the _Lxx, _Exx, _CRS, _PRS, or _SRS methods required for that block. To uniquely identify which GPE device is the legacy GPE block device, the operating system picks the first GPE block device having a hardware ID of ACPI0006 and without a _CRS.

The _CRS object evaluates to a byte stream that describes the system resources currently allocated to the GPE block device 91. The resource data is provided as a series of data structures, with each of the resource data structures having a unique tag or identifier. The resource descriptor data structures specify the standard PC system resources, such as memory address ranges, I/O ports, interrupts, and DMA channels.

A device having the above description may be used to specify a GPE block to handle hardware-surfaced events. For instance, optional methods can be added under the GPE block device 91 to handle different hardware-surfaced events. In the described example, the method _L12 may be used to handle a level-triggered event generated by the keyboard. Similarly, the method _E13 may be used to handle an edge-triggered event surfaced by the mouse. Any number or combination of methods may be used in accordance with the teachings of the present invention.

Also, optionally, a _PRS object may be used to specify the GPE block device's 91 possible resource settings, and a _SRS control method to set the device's settings to those possible resource settings. In this way, the GPE block device 91 may be programmed to resource settings other than the original resource settings.

The GPE block devices described in the context of the present invention each have their own unique address space, unlike the GPE hardware registers described in the ACPI 1.0 Specification. Thus, in accordance with the invention, if Pin XX is used by one GPE block, that Pin XX could also be used by another GPE Block in the system (including those as defined in the ACPI 1.0 Specification).

The benefits realized by the present invention are many. For example, the present invention allows multiple GPE Blocks to be present within a computer, which has, before now, not been possible. In addition, the present invention allows GPE block devices to use Memory Mapped accesses, which were not supported in the ACPI 1.0 Specification. Since I/O address space is more limited then the Memory Address space, particularly in large machines, this makes it easier to design such a system. In addition, more standard interrupt mechanisms may be used to surface signals generated by hardware components because the present invention eliminates the need for complex wiring to represent multiple GPE blocks as a single hardware device to the ACPI system. And moreover, the present invention allows the GPE block device to be relocatable in memory. This gives the operating system the flexibility of placing the GPE Block Device at some address that maximizes system resource availability.

Figure 5:
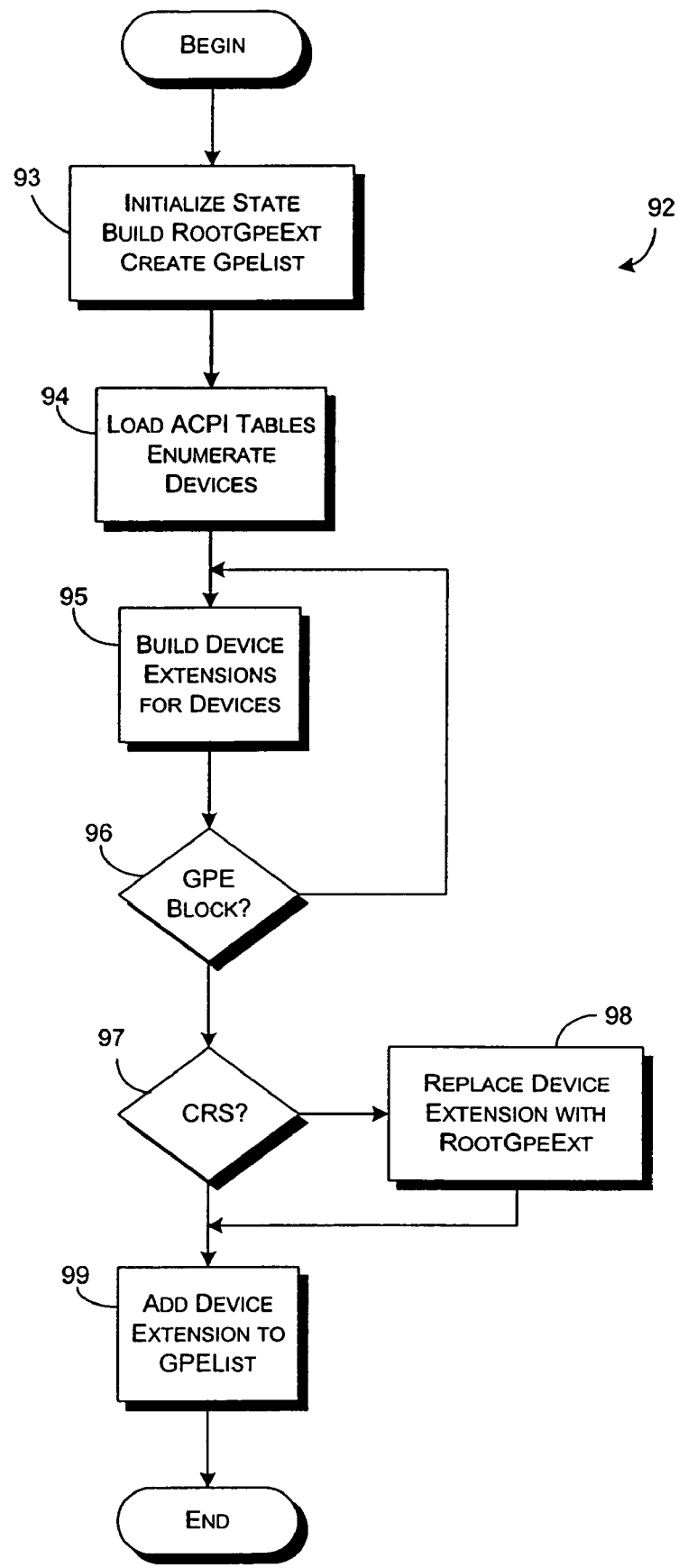
FIG. 5 is a logical flow diagram generally illustrating a process for creating a GPE block device within a namespace, in accordance with one embodiment of the present invention.

FIG. 5 is a logical flow diagram generally illustrating a process 92 for creating multiple GPE block devices within an ACPI namespace, in accordance with one embodiment of the present invention. The process begins at block 93, where an ACPI system starts up and initializes its state. During this process, the ACPI system creates a RootGPEExtension, which is a global variable that will point to the root or legacy GPE block device. In addition, a GPE List may be created to keep track of any GPE block devices that are included in the ACPI namespace, and a synchronization object may be created to track when ACPI device extensions associated with the ACPI device objects have been created.

At block 94, the ACPI system loads the ACPI tables that include differentiated definition blocks defining the several ACPI-compliant components of the computing system. Loading those ACPI tables causes the ACPI driver to begin the enumeration of the devices in the ACPI Namespace. At block 95, the ACPI driver begins to build ACPI device extensions for the ACPI namespace objects that were enumerated at block 94.

At decision block 96, a determination is made whether a current ACPI device is a GPE block device. If not, the process returns to block 95 until a device extension indicating a GPE block device is encountered. At that point, the process proceeds to decision block 97, where a determination is made whether the GPE block device contains a "_CRS" object. The absence of that object indicates that the GPE block is the root GPE block, and, therefore, at block 98, the device extension created for that device is replaced with the one pointed to by the RootGPEExtension. The replaced device extension can safely be destroyed. Finally, at block 99, the device extension for the current GPE block device is added to the GPE List. The process then terminates.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for including a plurality of general-purpose event components in a computing system, comprising:
   providing a computer management namespace;
   associating a plurality of objects with the namespace, wherein at least one of the objects defines a general-purpose event component and a sub-object that defines a set of resources used by the at least one object; and
   distinguishing the at least one object that defines the general-purpose event component from other objects in the namespace that define other general-purpose event components associated with the computer management namespace.

2. The computer-implemented method of claim 1, wherein the resources used by the at least one object are associated with I/O space resources.

3. The computer-implemented method of claim 1, wherein the resources used by the at least one object comprises memory space resources.

4. The computer-implemented method of claim 1, wherein the at least one object further comprises at least one control configured to manage a notice generated by a hardware device.

5. The computer-implemented method of claim 4, wherein the notice is generated by a device using standard interrupt mechanisms.

6. The computer-implemented method of claim 1, wherein the at least one object is configured to load to the namespace in response to a hardware component being added to the computing system.

7. The computer-implemented method of claim 6, wherein the at least one object is unloadable from the namespace.

8. A computer-implemented method for associating a plurality of general-purpose event components with a computing system, comprising:
   providing a first general-purpose event component having a first set of resources and a second general-purpose event component having a second set of resources;
   associating the first general-purpose event component with a first data object of a namespace of an advance configuration and power interface; and
   associating the second general-purpose event component with a second data object of the namespace of the advanced configuration and power interface.

9. The computer-implemented method of claim 8, wherein the second general-purpose event component comprises a root general-purpose event component, and wherein the first general-purpose event component comprises a secondary general-purpose event component.

10. The computer-implemented method of claim 8, further comprising storing the first data object and the second data object in a namespace associated with a configuration management system.

11. The computer-implemented method of claim 8, further comprising storing the first data object and the second data object within a basic input/output system (BIOS) associated with a configuration management system.

12. The computer-implemented method of claim 11, further comprising reading the first data object and the second data object from the BIOS.

13. The computer-implemented method of claim 12, wherein the first general-purpose event component and the second general-purpose event component each include a hardware device in electrical communication with one or more other hardware devices to detect an interrupt.

14. A computer-readable medium having computer executable instructions for associating a plurality of general-purpose event modules with a computer system, the instructions comprising:

associating a first general-purpose event module with a first data object of a namespace of an advance configuration and power interface, wherein the first general-purpose event includes a first set of resources; and associating a second general-purpose event module with a second data object of the namespace of the advanced configuration and power interface.

15. The computer-readable medium of claim 14, wherein the second-general-purpose event module comprises a root general-purpose event module, and wherein the first general-purpose event module comprises a secondary general-purpose event module.

16. The computer-implemented medium of claim 14, further comprising storing the first data object and the second data object in a namespace associated with a configuration management system.

17. The computer-implemented medium of claim 14, further comprising storing the first data object and the second data object within a basic input/output system (BIOS) associated with a configuration management system.

18. The computer-implemented medium of claim 14, further comprising reading the first data object and the second data object from the BIOS.

19. The computer-implemented medium of claim 18, wherein the first general-purpose event module and the second general-purpose event module each include a hardware device in electrical communication with one or more other hardware devices to detect an interrupt.

20. The computer-implemented medium of claim 14, wherein the first set of resources includes at least one of: I/O space resources and memory space resources.

* * * * *